(12) United States Patent
Wang (10) Patent No.: US 11,889,057 B2
(45) Date of Patent: Jan. 30, 2024

(54) VIDEO ENCODING METHOD AND RELATED VIDEO ENCODER

(71) Applicant: NOVATEK Microelectronics Corp., Hsin-Chu (TW)

(72) Inventor: Yu-Min Wang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/585,569

(22) Filed: Jan. 27, 2022

(65) Prior Publication Data

US 2022/0247998 A1 Aug. 4, 2022

Related U.S. Application Data

(60) Provisional application No. 63/144,933, filed on Feb. 2, 2021.

(51) Int. Cl.
| | |
|---|---|
| *H04N 19/172* | (2014.01) |
| *H04N 19/177* | (2014.01) |
| *H04N 19/105* | (2014.01) |
| *H04N 19/159* | (2014.01) |

(52) U.S. Cl.
CPC ......... *H04N 19/105* (2014.11); *H04N 19/159* (2014.11); *H04N 19/172* (2014.11); *H04N 19/177* (2014.11)

(58) Field of Classification Search
CPC ........................... H04N 19/105; H04N 19/159
See application file for complete search history.

(56) References Cited

U.S. PATENT DOCUMENTS

| | | | | |
|---|---|---|---|---|
| 10,404,992 | B2 * | 9/2019 | Rapaka | H04N 19/127 |
| 2006/0233250 | A1 * | 10/2006 | Cha | H04N 19/176 |
| | | | | 375/E7.176 |
| 2012/0320979 | A1 * | 12/2012 | Lundberg | H04N 19/105 |
| | | | | 375/E7.149 |
| 2013/0064285 | A1 * | 3/2013 | Karlsson | H04N 21/6125 |
| | | | | 375/E7.126 |
| 2013/0202038 | A1 * | 8/2013 | Seregin | H04N 19/52 |
| | | | | 375/240.15 |
| 2014/0098861 | A1 | 4/2014 | Yu | |
| 2014/0105279 | A1 * | 4/2014 | Hattori | H04N 19/52 |
| | | | | 375/240.03 |
| 2016/0142729 | A1 * | 5/2016 | Wang | H04N 19/52 |
| | | | | 375/240.16 |
| 2017/0034526 | A1 * | 2/2017 | Rapaka | H04N 19/176 |

(Continued)

FOREIGN PATENT DOCUMENTS

| | | |
|---|---|---|
| CN | 105847825 A | 8/2016 |
| WO | 2018/036352 A1 | 3/2018 |

*Primary Examiner* — Irfan Habib
(74) *Attorney, Agent, or Firm* — Winston Hsu (57) ABSTRACT

A method for a video encoder includes steps of: receiving a series of input frames; performing at least one of intra-prediction and inter-prediction on the series of input frames for generating at least one of an intra frame (I-frame), a predictive frame (P-frame), and a key predictive frame (key P-frame); generating an encoded bitstream with respect to a first input frame determined as the I-frame among the series of input frames; and performing inter-prediction on a second input frame determined as a key P-frame among the series of input frames according to a first reference frame which is derived from the encoded bitstream with respect to the first input frame.

11 Claims, 7 Drawing Sheets

(56) References Cited

U.S. PATENT DOCUMENTS

| | | | |
|---|---|---|---|
| 2018/0139439 A1* | 5/2018 | Jun | H04N 19/187 |
| 2020/0177889 A1* | 6/2020 | Kim | H04N 19/70 |
| 2021/0279840 A1* | 9/2021 | Chi | G06T 3/40 |
| 2021/0281867 A1* | 9/2021 | Golinski | G06N 3/045 |
| 2022/0295071 A1* | 9/2022 | Ji | H04N 19/59 |
| 2022/0295095 A1* | 9/2022 | Pourreza | G06N 3/088 |

\* cited by examiner

VIDEO ENCODING METHOD AND RELATED VIDEO ENCODER

CROSS REFERENCE TO RELATED APPLICATIONS

This application claims the benefit of U.S. Provisional Application No. 63/144,933, filed on Feb. 2, 2021, the contents of which are incorporated herein by reference.

BACKGROUND OF THE INVENTION

1. Field of the Invention

The present invention relates to a video encoding method and a related video encoder, and more particularly, to a video encoding method and a related video encoder for reducing the usage of memory.

2. Description of the Prior Art

The conventional video encoding method is to encode the current frame by referring to the previous frame. A currently available encoding technology provides a Group of Picture (GOP) encoding structure. In addition to referring to the previous frame, the encoding scheme may also refer to a specially reserved intra frame (I-frame) longer before as a long-term reference frame. In the structure of GOP, a series of predictive frames (P-frames) starting with an I-frame can be regarded as a group.

Figure 1:
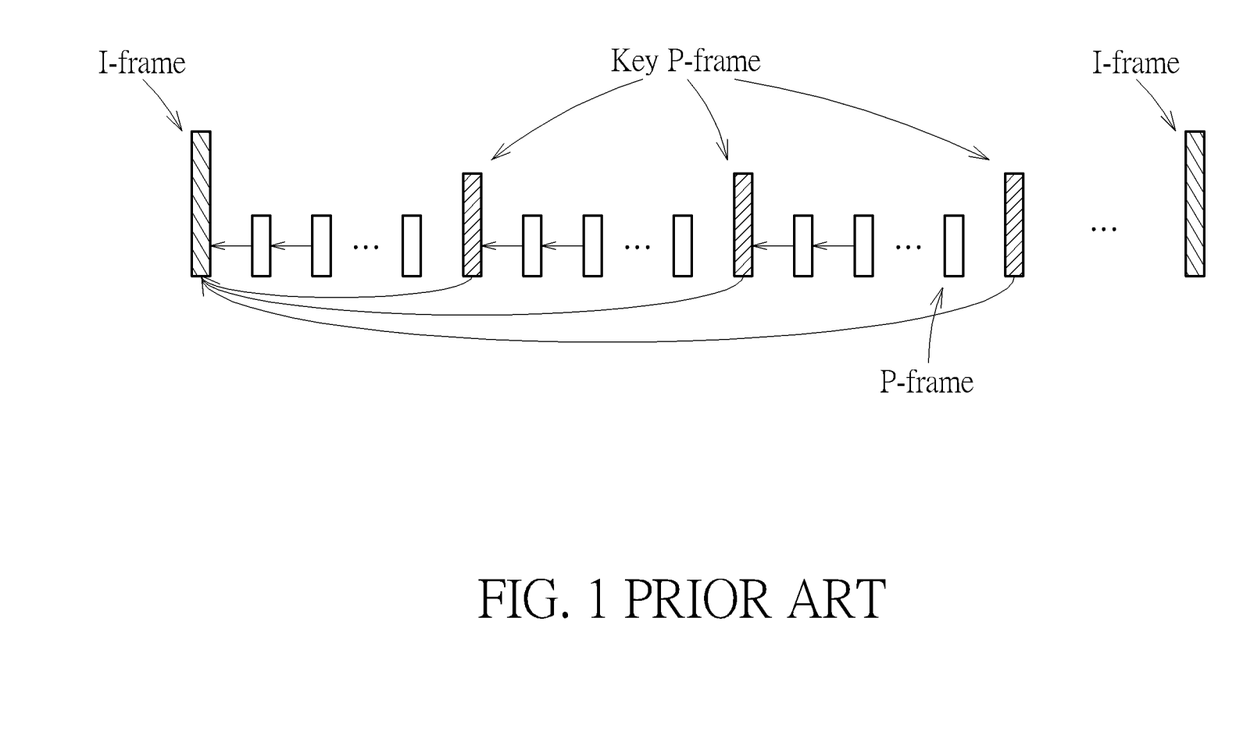
FIG. 1 is a schematic diagram of a GOP encoding structure.

In the operation of image processing, I-frames usually have more bitstreams. Therefore, in order to reduce the overall bit rate, the distance between the I-frames (i.e., the length of the group) may be lengthened to reduce the total number of I-frames. For example, frames spaced apart by a time interval of 4 or 5 seconds may be configured as I-frames, and the time interval between I-frames may vary depending on the application. However, the disadvantage of extending the time interval between I-frames is that, since each P-frame to be displayed needs to be reproduced directly or indirectly with reference to the I-frame, it may not be possible to quickly find a suitable I-frame to generate the image when playing back or skipping the video. To solve this problem, a key P-frame may be configured in every multiple P-frames in the group, as shown in FIG. 1. The decoding of the key P-frame does not refer to the previous frame, but directly refers to the I-frame of the group. Therefore, in the operation of searching for playback, the image frame can be quickly acquired as long as the key P-frame is found.

However, in order to achieve the above purpose of reducing the bit rate, in addition to a frame buffer used to store the previous frame, the system (which can be a video encoder, a video decoder, or a video codec) needs to be allocated with an additional frame buffer or more storage space for storing the I-frame to be used for encoding or decoding the subsequent key P-frames. In other words, the previous frame may be applied as the reference frame for decoding a general P-frame, and the I-frame may be applied as the reference frame for decoding the key P-frame; hence, the system totally requires two frame buffers for storing the reference frames, or the disposed frame buffer should have a larger size to accommodate at least two frames. The additional buffer occupies a lot of memory space. Thus, there is a need for improvement over the prior art.

SUMMARY OF THE INVENTION

It is therefore an objective of the present invention to provide a video encoding method and a related video encoder, for reducing the usage of memory space, in order to solve the abovementioned problems.

An embodiment of the present invention discloses a method for a video encoder. The method comprises steps of: receiving a series of input frames; performing at least one of intra-prediction and inter-prediction on the series of input frames for generating at least one of an intra frame (I-frame), a predictive frame (P-frame), and a key predictive frame (key P-frame); generating an encoded bitstream with respect to a first input frame determined as the I-frame among the series of input frames; and performing inter-prediction on a second input frame determined as a key P-frame among the series of input frames according to a first reference frame which is derived from the encoded bitstream with respect to the first input frame.

Another embodiment of the present invention discloses a video encoder, which comprises a receiving circuit, an intra-prediction circuit, an inter-prediction circuit and an entropy encoding circuit. The receiving circuit is configured to receive a series of input frames. The intra-prediction circuit is configured to perform intra-prediction on a first input frame determined as an I-frame among the series of input frames. The inter-prediction circuit is configured to perform inter-prediction on a second input frame determined as a key P-frame among the series of input frames according to a first reference frame which is derived from an encoded bitstream with respect to the first input frame. The entropy encoding circuit is configured to generate the encoded bitstream with respect to the first input frame.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
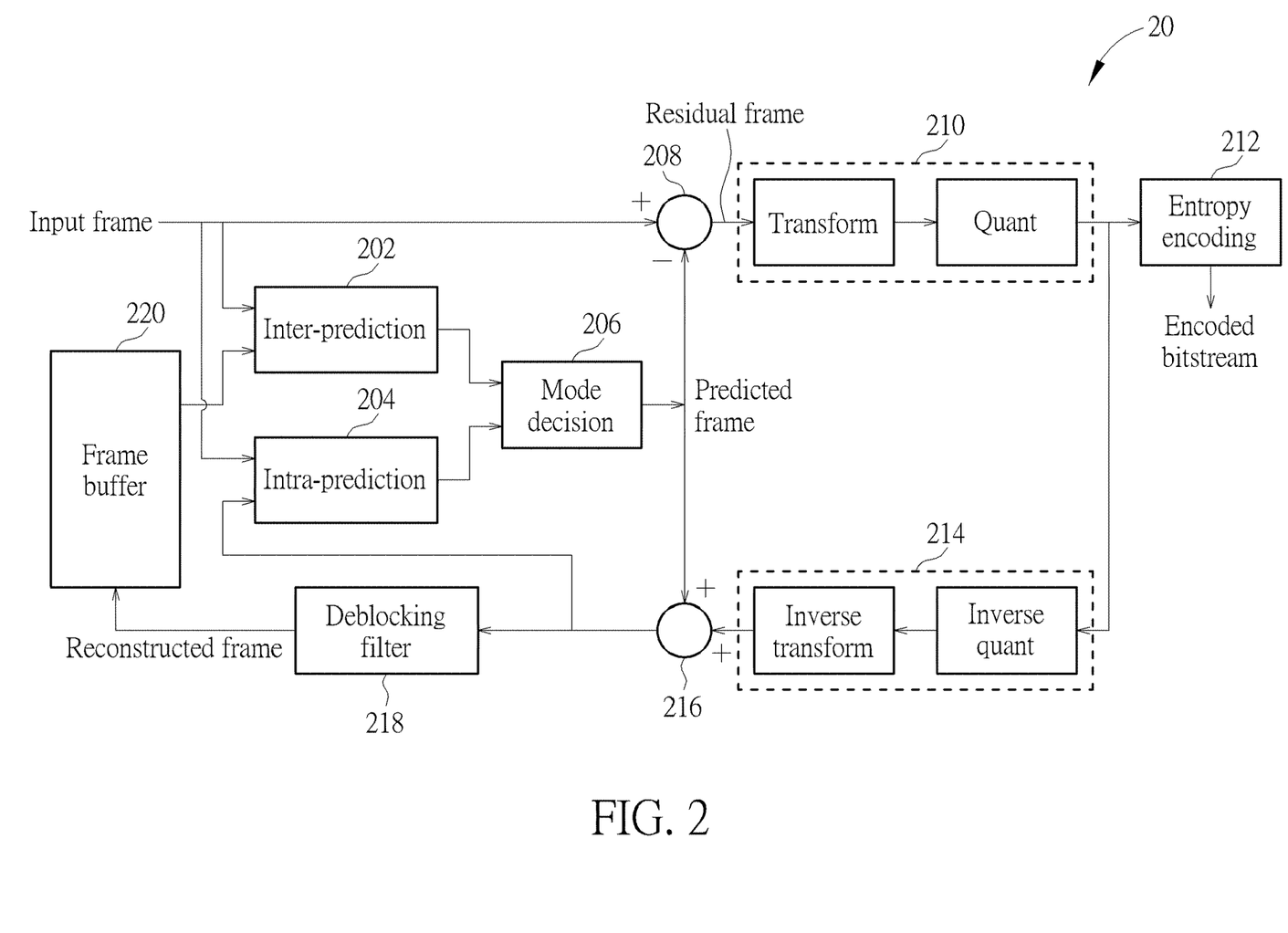
FIG. 2 is a schematic diagram of a general video encoder.

Please refer to FIG. 2, which is a schematic diagram of a general video encoder 20. For each received input frame, the video encoder 20 may choose to process the input frame in an intra-prediction mode or an inter-prediction mode to obtain a predicted frame. The video encoder 20 calculates the difference between the input frame and the predicted frame to generate a residual frame, performs compression on the residual frame, and then performs entropy coding to generate the encoded bitstream. As shown in FIG. 2, the video encoder 20 includes an inter-prediction circuit 202, an intra-prediction circuit 204, a mode decision circuit 206, a residual calculation circuit 208, a compression circuit 210, an entropy encoding circuit 212, a decompression circuit 214, a combining circuit 216, a deblocking filter circuit 218 and a frame buffer 220. The operations of these circuits of the video encoder 20 are block-based, which means processing image data by macroblocks, which size may be 8*8 pixels or 16*16 pixels, for example. The video encoder 20 may also include a receiver or receiving circuit (not illustrated) used to receive a series of input frames from a video source.

The inter-prediction circuit 202 is configured to perform inter-prediction on the input frame according to a reference frame received from the frame buffer 220. For example, the inter-prediction circuit 202 may include a motion estimation unit and a motion compensation unit. The motion estimation unit is configured to perform motion estimation on the input frame based on the reference frame, and provide motion estimation information for the motion compensation unit. The motion compensation unit is configured to perform motion compensation to generate an inter-predicted frame based on the received motion estimation information.

The intra-prediction circuit 204 is configured to perform intra-prediction on the input frame to generate an intra-predicted frame. Motion estimation in the intra-prediction operations is performed based on the image content between macroblocks in the input frame without referring to a reference frame.

The mode decision circuit 206 may receive the information regarding the determined prediction mode applied to the current input frame, and selectively output the predicted frame generated by the inter-prediction circuit 202 or the intra-prediction circuit 204 based on the prediction mode information. More specifically, if the determined prediction mode is the intra-prediction mode, the mode decision circuit 206 outputs the intra-predicted frame generated by the intra-prediction circuit 204 as the predicted frame; and if the determined prediction mode is the inter-prediction mode, the mode decision circuit 206 outputs the inter-predicted frame generated by the inter-prediction circuit 202 as the predicted frame.

When receiving the predicted frame, the residual calculation circuit 208 may generate a residual frame based on the predicted frame (which may be the intra-predicted frame or the inter-predicted frame) and the input frame. For example, the residual calculation circuit 208 may calculate the difference between the input frame and the predicted frame to generate the residual frame.

The compression circuit 210 is configured to perform several compression operations on the residual frame. Such compression operations include transform and quantization. The transform operation may convert the residual frame into transform coefficients. The quantization operation may quantize the transform coefficients based on quantization parameters (QPs), and output the quantized transform coefficients to the entropy encoding circuit 212.

The entropy encoding circuit 212 then performs entropy coding based on the quantized transform coefficients corresponding to the residual frame and the associated picture prediction mode information, to generate an encoded bitstream. For example, in the intra-prediction mode, the entropy encoding circuit 212 performs entropy coding based on the associated intra-prediction mode information to generate the encoded bitstream. Examples of the entropy coding include, but not limited to, the Context-based Adaptive Binary Arithmetic Coding (CABAC) and Variable-Length Coding (VLC). Since the encoded bitstream is generated based on the residual information extracted from the difference of the input frame and the predicted frame and the residual information is further compressed, the data amount of the encoded bitstream corresponding to an input frame is usually far less than the data amount of the input frame.

The quantized transform coefficients are further output to the decompression circuit 214, which is configured to decompress the quantized transform coefficients. Such decompression operations include inverse quantization and inverse transform. The inverse quantization may convert the quantized transform coefficients into a reconstructed version of transform coefficients after being dequantized. The inverse transform is performed on the dequantized transform coefficients to reconstruct the residual information of the residual frame.

When receiving the residual information from the decompression circuit 214, the combining circuit 216 may combine the residual information and the predicted frame to generate a reconstructed frame. For example, the combining circuit 216 may add the residual information to the predicted frame to generate the reconstructed frame.

The reconstructed frame may be provided for the intra-prediction circuit as a reference for intra-prediction operations. The reconstructed frame may also be processed by the deblocking filter circuit 218. The deblocking filter circuit 218 may also store the deblocked reconstructed frame in the frame buffer 220, to be served as a reference frame for encoding subsequent input frame (s).

Figure 3:
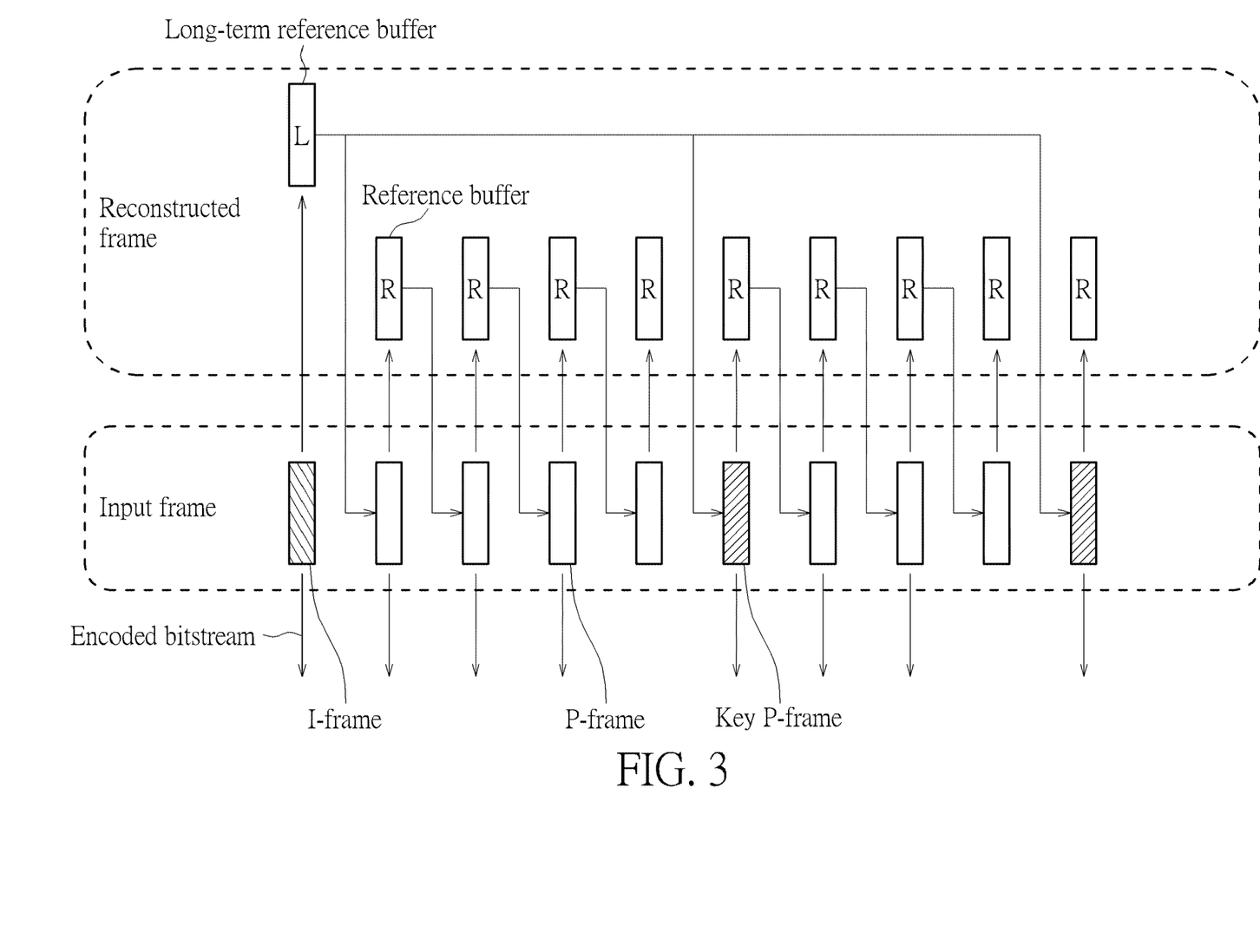
FIG. 3 illustrates a series of input frames used to generate the reconstructed frames and the encoded bitstreams through a video encoder and the related video encoding method of the reconstructed frames.

Please refer to FIG. 3, which illustrates a series of input frames used to generate the reconstructed frames and the encoded bitstreams through a video encoder (e.g., the video encoder 20 shown in FIG. 2) and the related video encoding method of the reconstructed frames. In this example, the series of input frames may be regarded as a group of the Group of Picture (GOP) structure. The first (earliest) input frame in the group is determined as an intra frame (I-frame), which is followed by a plurality of input frames determined as predictive frames (P-frames). Among the P-frames, several input frames spaced apart by a predetermined time interval are determined as key P-frames. The predetermined time interval may be defined based on the number of input frames which pass by from one key P-frame to the next key P-frame. Each input frame may be processed by the video encoder with the video encoding procedure as described above, to generate a reconstructed frame.

If a currently received input frame is determined as the I-frame, the prediction mode information may indicate that the intra-prediction is performed, and the intra-predicted frame generated by the intra-prediction circuit 204 may be output and selected by the mode decision circuit 206 based on the prediction mode information to be used as the predicted frame. At this moment, the encoding operations may not refer to any other reference frame.

If a currently received input frame is determined as the P-frame (or the key P-frame), the prediction mode information may indicate that the inter-prediction with reference to a reference frame is performed, and the inter-predicted frame generated by the inter-prediction circuit 202 may be output and selected by the mode decision circuit 206 based on the prediction mode information to be used as the predicted frame. It is noted that the video encoding is a block-based data processing, and the aforementioned residual frame, the intra-predicted frame, the inter-predicted frame and the reconstructed frame are generated block by block.

As shown in FIG. 3, after the I-frame is encoded, the generated reconstructed frame may be stored in a frame buffer L. The frame buffer L, which is considered as a long-term reference frame buffer, may be a component of the frame buffer 220 in the video encoder 20. The next frame is a P-frame, for which the video encoder 20 may take the previous reconstructed frame from the frame buffer L as the reference frame for performing inter-prediction, generate a new reconstructed frame, and then store this reconstructed frame in a frame buffer R (or called reference frame buffer). The frame buffer R may be another component of the frame buffer 220 in the video encoder 20. The video encoder 20 may use the previous reconstructed frame from the frame buffer R as the reference frame for performing inter-prediction to generate every subsequent P-frame, and a new reconstructed frame is generated and stored in the frame buffer R to replace the previous one. If an input frame is determined as the key P-frame, the reconstructed frame generated from the I-frame and stored in the frame buffer L is taken as the reference frame for performing inter-prediction, and a new reconstructed frame is generated and stored in the frame buffer R to replace the previous one.

In other words, in the same GOP, the content of the frame buffer R is continuously updated, while the frame buffer L always stores the reconstructed data corresponding to the I-frame. The content of the frame buffer L is not updated until the next I-frame (i.e., the I-frame of the next GOP) arrives and the corresponding reconstructed frame is generated.

As shown in FIG. 3, in addition to the reconstructed frame, the residual frame with respect to each input frame may also be compressed to generate an encoded bitstream. As mentioned above, the data amount of the encoded bitstream is usually far less than the data amount of the input frame. The data amount of the reconstructed frame may be identical to the data amount of the input frame. Therefore, the data amount of the encoded bitstream is also far less than the data amount of the reconstructed frame. In general, the encoded bitstream may be generated with a compression ratio greater than 10:1, to reach the data amount lower than 1/10 of the data amount of the input frame and the reconstructed frame.

In the memory allocation scheme as shown in FIG. 3, the video encoder needs to configure two frame buffers (or one frame buffer which size accommodates two frames) to store the reference frames, where a lot of memory space is necessary. In order to save the usage of memory, the embodiment of the present invention provides a video encoding scheme to be used for the abovementioned image encoding processing of GOP.

Figure 4:
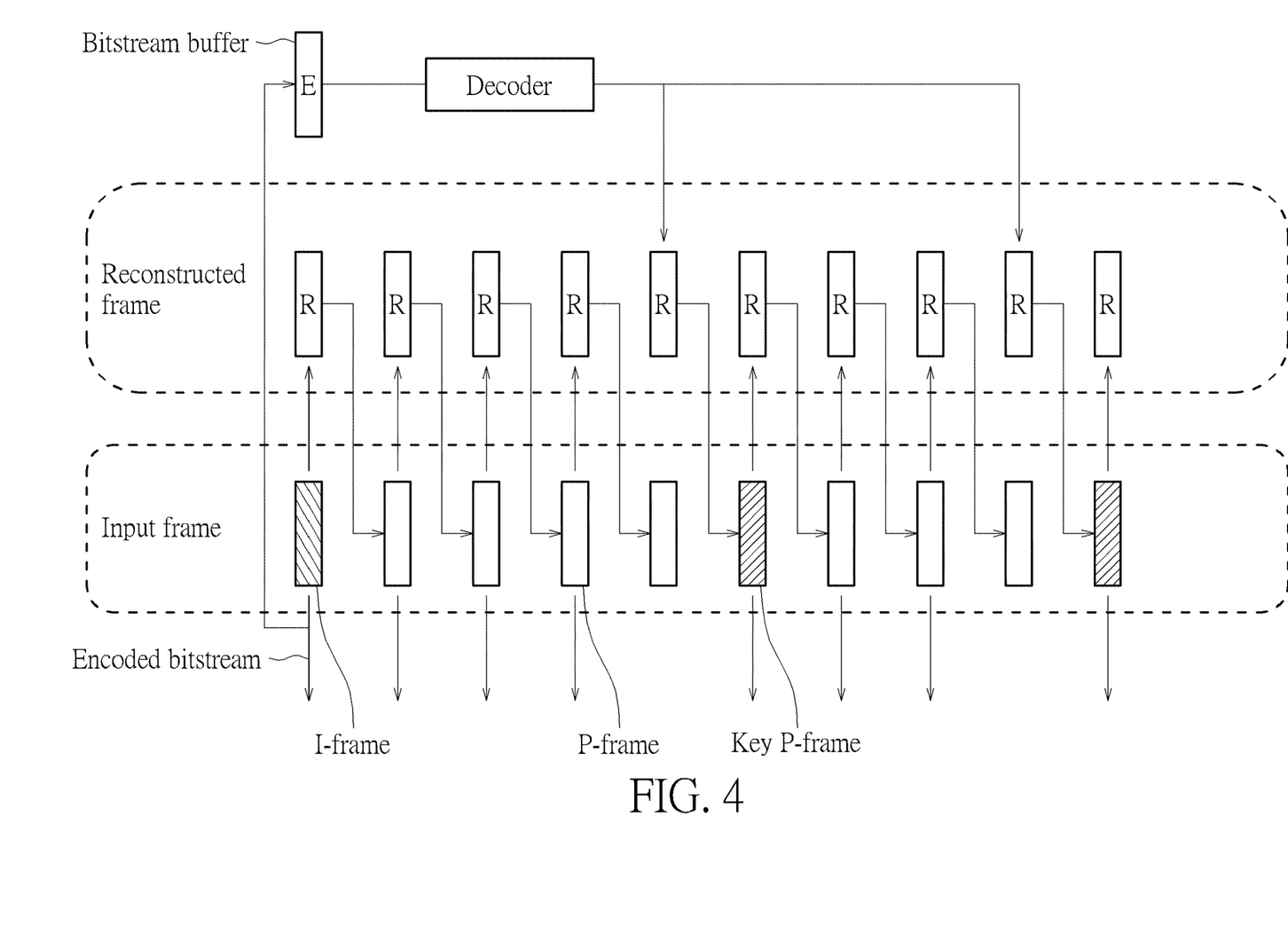
FIG. 4 illustrates a series of input frames used to generate the reconstructed frames and the encoded bitstreams through a video encoder and the related video encoding method according to an embodiment of the present invention.

Please refer to FIG. 4, which illustrates a series of input frames used to generate the reconstructed frames and the encoded bitstreams through a video encoder (such as a video encoder 50 shown in FIG. 5) and the related video encoding method according to an embodiment of the present invention. Similarly, the series of input frames may be regarded as a group of the GOP structure, which is composed of an I-frame, several key P-frames and multiple P-frames. In this embodiment, the memory space allocated to the video encoder includes a frame buffer R and a bitstream buffer E. The frame buffer R is similar to that in the example of FIG. 3, which is used to store the image content of a reconstructed frame as a reference frame. The bitstream buffer E is used to store the encoded bitstream generated by the entropy encoding circuit.

More specifically, when the input frame input to the video encoder is treated as the I-frame, the reconstructed frame with respect to the I-frame is stored in the frame buffer R and the encoded bitstream is stored in the bitstream buffer E. More specifically, the video encoder may perform intra-prediction on the I-frame through the intra-prediction circuit to generate an intra-predicted frame (as the predicted frame output to the residual calculation circuit). The residual frame regarding the input frame treated as the I-frame is generated based on the predicted frame and the input frame, and the residual frame are further quantized/dequantized and transformed/inverse-transformed to generate the reconstructed frame, and also entropy-coded to generate the encoded bitstream.

When an input frame is determined as a P-frame except a key P-frame, the video encoder may take the previous reconstructed frame from the frame buffer R as the reference frame to perform inter-prediction, and to generate a new reconstructed frame with respect to the P-frame and to store the new reconstructed frame in the frame buffer R.

In the same group of the GOP, the key P-frames need to refer to the I-frame as the reference frame for inter-prediction. Note that the information of the I-frame is carried in the encoded bitstream stored in the bitstream buffer E. Therefore, when an input frame determined as the key P-frame is received, the encoded bitstream stored in the bitstream buffer E may be restored by decoding, and a decoder can serve this purpose. In an embodiment, when the video encoder processes a previous frame prior to a key P-frame, the encoded bitstream stored in the bitstream buffer E may be decoded by the decoder and then be stored in the frame buffer R, as shown in FIG. 4. At this moment, the frame buffer R does not need to be used to store the content of the previous reconstructed frame, so the reconstructed frame with respect to the I-frame generated by decoding the encoded bitstream may be written into the frame buffer R. The video encoder may take the reconstructed frame with respect to the I-frame from the frame buffer R as the reference frame for performing inter-prediction on the key P-frame, and generate a new reconstructed frame with respect to this key P-frame and may still store the reconstructed frame in the frame buffer R, to be used by the following P-frame.

As a result, for the processing of general P-frames, the video encoder may directly use the frame data stored in the frame buffer R as the reference frame, and for the processing of key P-frames, the video encoder may use a decoder to decode the encoded bitstreams stored in the bitstream buffer E to get the reconstructed frame with respect to the I-frame back and then write it into the frame buffer R as the reference frame, so as to complete the image processing operations.

Based on the above operations applied to the GOP encoding structure, there is no need to allocate two frame buffers as illustrated in FIG. 3, where one is the frame buffer L and the other is the frame buffer R. According to the video encoding method as illustrated by FIG. 4, the frame buffer L originally used to store the reconstructed frame with respect to the I-frame may be substituted by the bitstream buffer E having smaller space, to realize the function of providing the long-term reference frame. More specifically, the frame buffer L shown in FIG. 3 is used for storing the reconstructed frames which are uncompressed image data, but the bitstream buffer E shown in FIG. 4 only needs to store the encoded bitstream which is compressed image data and much smaller than the size of the reconstructed frame. Taking an image frame having 4M pixels as an example, the size of the generated reconstructed frame is about 6 MB, but the size of the compressed/encoded bitstream may be 500 kB-800 kB or lower depending on the compression ratio. As a result, the video encoder only needs to use about 1/10 of the original memory space to store the image content information of the I-frame in the bitstream format, where a decoder should be deployed with the video encoder. When the key P-frame needs to use the I-frame as the reference frame, the decoder may be used to decode the encoded bitstream stored in the bitstream buffer E to get the reconstructed frame with respect to the I-frame back. This decoder may be realized by using an existing decoder of the system (e.g., when the system uses a video codec capable of decoding functions) or by allocating an additional decoder.

Figure 5:
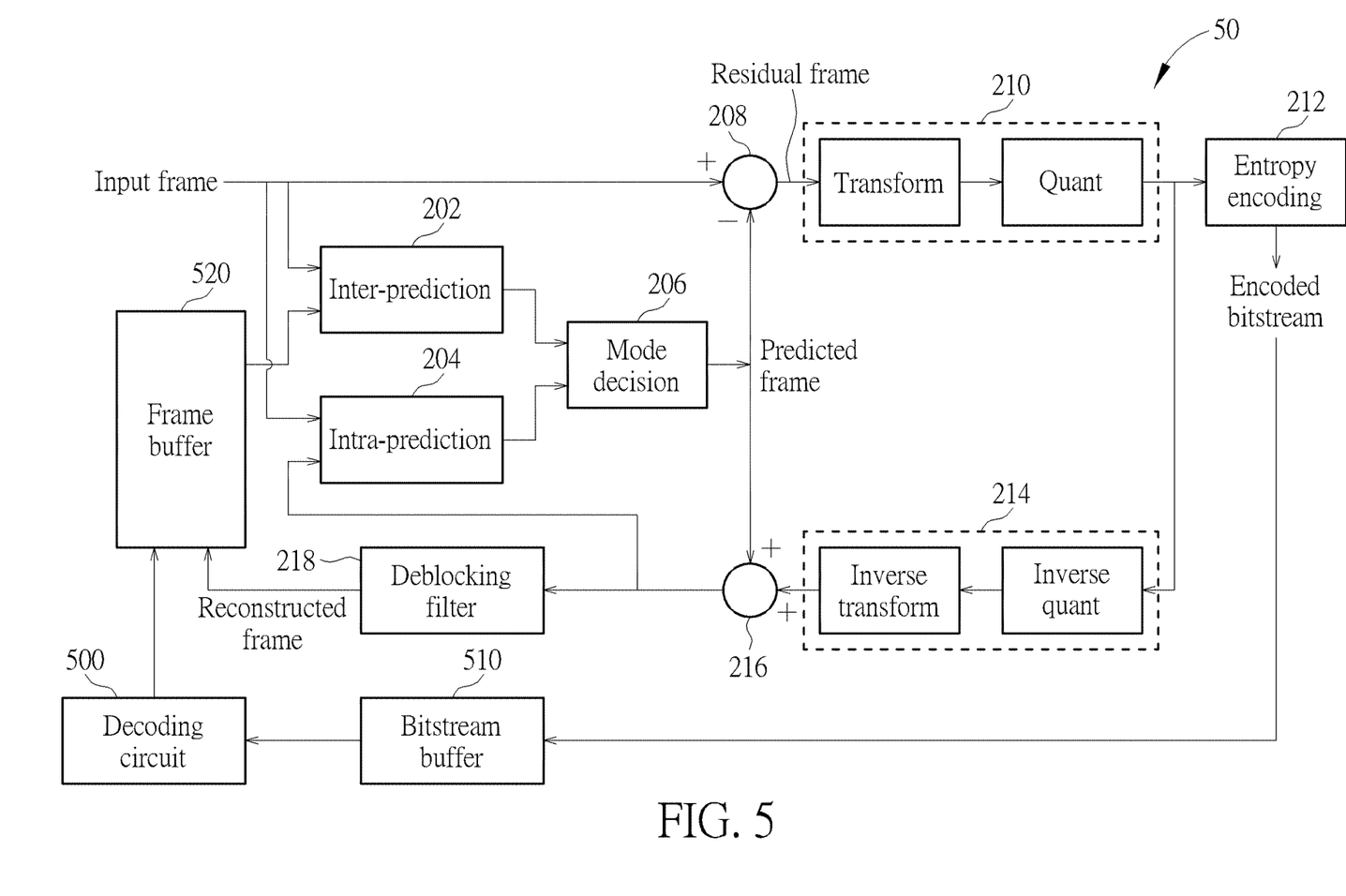
FIG. 5 is a schematic diagram of a video encoder according to an embodiment of the present invention.

Please refer to FIG. 5, which is a schematic diagram of the video encoder 50 according to an embodiment of the present invention. As shown in FIG. 5, the structure of the video encoder 50 is similar to the structure of the video encoder 20 shown in FIG. 2, so signals and elements having similar functions are denoted by the same symbols. The video encoder 50 is different from the video encoder 20 in that, the video encoder 50 further includes a decoding circuit 500, and an additional bitstream buffer 510 may be embedded in or deployed with the video encoder 50. In addition, the frame buffer 220 in the video encoder 20 may be replaced by a smaller frame buffer 520 in the video encoder 50. More specifically, in the video encoder 50, the frame buffer 520 is requested to accommodate one frame, while in the video encoder 20, the frame buffer 220 is requested to accommodate the reconstructed frames of one previous P-frame and a long-term reference frame (i.e., the I-frame); hence, the size of the frame buffer 220 may be twice the size of the frame buffer 520.

In the video encoder 50, the encoded bitstream with respect to the I-frame generated by the entropy encoding circuit 212 may be stored in the bitstream buffer 510. When an input frame determined as the key P-frame is received, the decoding circuit 500 (or called decoder) may receive the encoded bitstream from the bitstream buffer 510 and decode the bitstream to generate a reference frame. The reference frame may be stored in the frame buffer 520, to be used for the inter-prediction performed on the key P-frame. The detailed operations of other circuit modules/blocks in the video encoder 50 are similar to those in the video encoder 20 shown in FIG. 2, and will be omitted herein.

Figure 6:
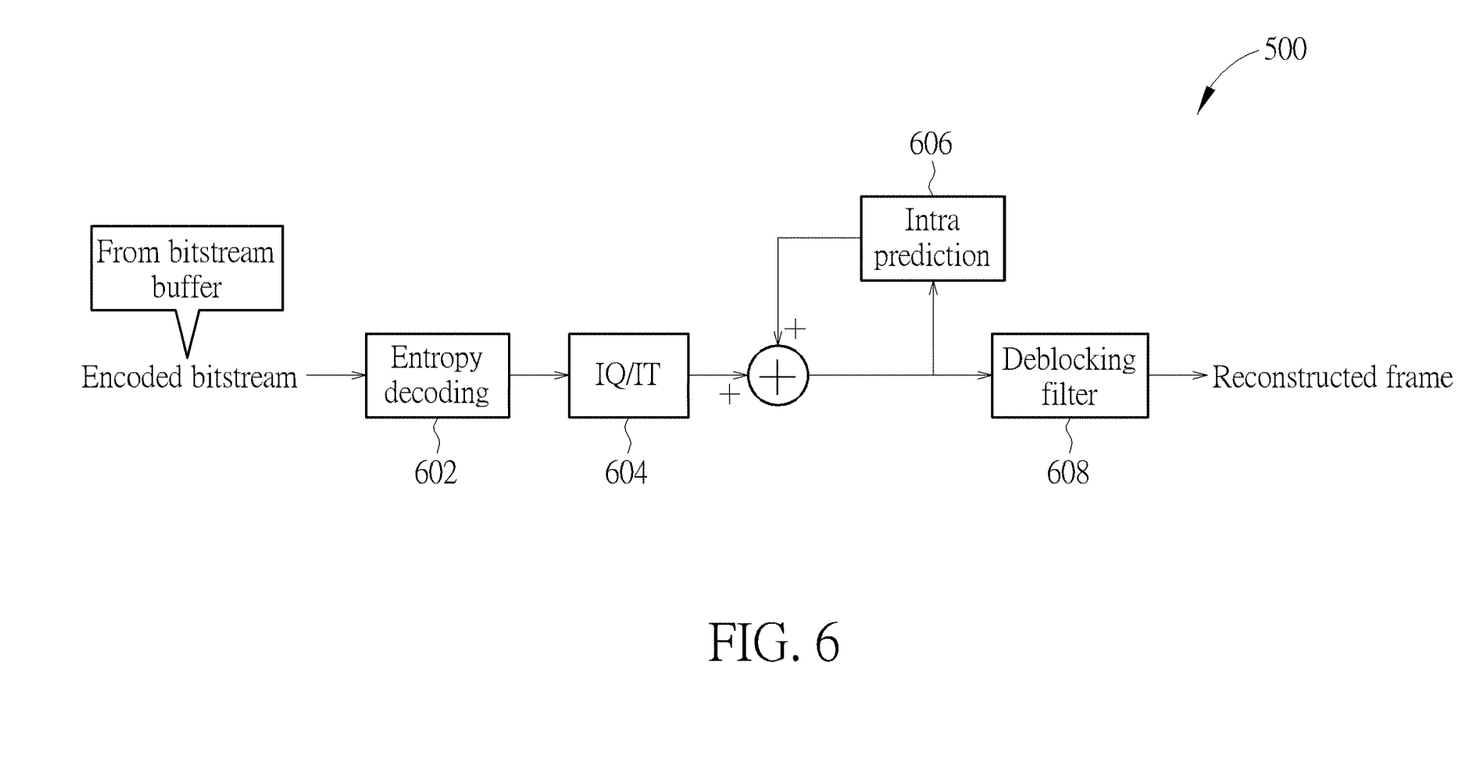
FIG. 6 illustrates an exemplary implementation of the decoding circuit according to an embodiment of the present invention.

Please refer to FIG. 6, which illustrates an exemplary implementation of the decoding circuit 500 according to an embodiment of the present invention. As shown in FIG. 6, the decoding circuit 500 includes an entropy decoding circuit 602, an inverse quantization (IQ) and inverse transform (IT) circuit 604, an intra-prediction circuit 606 and a deblocking filter circuit 608. The encoded bitstream taken from the bitstream buffer may be received by the entropy decoding circuit 602, which decodes the encoded bitstream to generate the quantized transform coefficients. Examples of the entropy decoding circuit 602 include, but not limited to, the CABAC decoder and Variable-Length Decoder (VLD). The quantized transform coefficients may further be dequantized and inverse-transformed by the IQ/IT circuit 604 to restore the quantized transform coefficients to get the residual frame back. The intra-prediction circuit 606 then performs intra-prediction according to the residual frame, to generate reconstructed frame. The reconstructed frame may further be converted into a deblocked reconstructed frame through the deblocking filter circuit 608. The (deblocked) reconstructed frame may be used as a long-term reference frame for the key P-frames in the GOP.

Please note that the structure shown in FIG. 6 is one of various implementations of the decoding circuit 500. In an embodiment, the video encoder may be a video encoder integrated circuit (IC), and the decoding circuit may be an additional decoder embedded in the video encoder IC. In another embodiment, the video encoder may be included in a video codec IC, and the decoding circuit may be a component of the video decoder part of the video codec IC. In fact, as long as the decoding circuit may be used to process the encoded bitstream and restore the encoded bitstream to the reconstructed frame carrying the information of the original image frame, it may be applied in the video encoder.

It should also be noted that the present invention aims at providing a video encoding method and a related video encoder for reducing the usage of memory space. Those skilled in the art may make modifications and alterations accordingly. For example, the video encoder may be an H.264 encoder deployed with a decoding circuit as the structure shown in FIG. 5. In another embodiment, the video encoder may be an H.265 encoder or any other encoding circuit which is deployed with a decoding circuit, where the decoding circuit is used for decoding the encoded bitstream corresponding to the I-frame to generate a reference frame.

The circuit modules of the video encoder and the decoding circuit provided in the present invention may be implemented in any suitable form, such as software, firmware, hardware, or their combinations. The implementations may include, for example, one or more digital signal processors (DSPs), microprocessors, discrete logic circuits, application specific integrated circuits (ASICs), etc.

Figure 7:
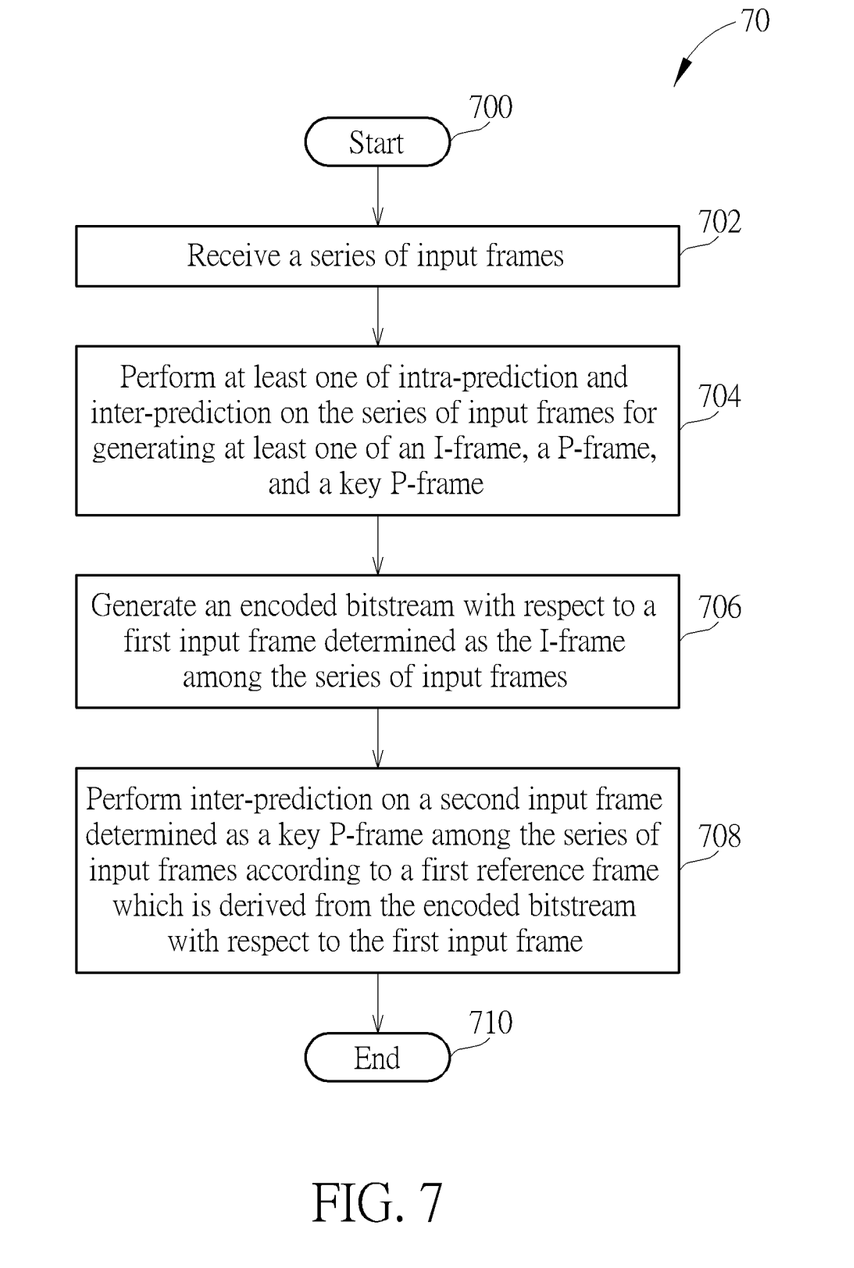
FIG. 7 is a flowchart of an encoding process according to an embodiment of the present invention.

The abovementioned operations of the video encoder may be summarized into an encoding process 70, as shown in FIG. 7. The encoding process 70, which may be implemented in a video encoder such as the video encoder 50 shown in FIG. 5, includes the following steps:

Step 700: Start.

Step 702: Receive a series of input frames.

Step 704: Perform at least one of intra-prediction and inter-prediction on the series of input frames for generating at least one of an I-frame, a P-frame, and a key P-frame.

Step 706: Generate an encoded bitstream with respect to a first input frame determined as the I-frame among the series of input frames.

Step 708: Perform inter-prediction on a second input frame determined as a key P-frame among the series of input frames according to a first reference frame which is derived from the encoded bitstream with respect to the first input frame.

Step 710: End.

According to the encoding process 70, the encoded bitstream with respect to the first input frame (i.e., the I-frame) may be stored in a bitstream buffer, and the encoded bitstream may be decoded to generate the first reference frame, which may be stored in a frame buffer. Therefore, the usage of frame buffer size may be reduced since the memory space for storing the long-term reference frame may be saved; that is, the long-term reference frame is stored in the bitstream format. The encoded bitstream is generated after being compressed and encoded and thus the data amount of the encoded bitstream is far less than the data amount of the input frame or reconstructed frame. Other detailed implementations and operations of the encoding process 70 are described in the above paragraphs, and will not be narrated herein.

To sum up, the present invention provides a video encoding method and a related video encoder. The video encoding method may be used for a GOP encoding structure, where a group includes an I-frame, several key P-frames and multiple P-frames. In the GOP encoding scheme, the P-frames are processed through inter-prediction with reference to the information of the previous frame, and the key P-frames are processed through inter-prediction with reference to the information of the I-frame in the same group. The information of the previous frame may be stored in the frame buffer. The information of the I-frame may be carried in the encoded bitstream and stored in the bitstream buffer without using additional memory space of the frame buffer. In such a situation, the memory space required by the video encoder totally includes a frame buffer for storing one frame and a bitstream buffer for storing the encoded bitstream. Since the encoded bitstream is generated after being compressed and encoded, the data amount of the encoded bitstream is far less than the data amount of the original input frame. Therefore, in contrast to the conventional implementation where the reconstructed I-frame is stored in the long-term reference frame buffer, the video encoding method of the present invention may significantly reduce the usage of memory space.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a video encoder, comprising:
   receiving a series of input frames;
   performing at least one of intra-prediction and inter-prediction on the series of input frames for generating at least one of an intra frame (I-frame), a predictive frame (P-frame), and a key predictive frame (key P-frame);
   generating an encoded bitstream with respect to a first input frame determined as the I-frame among the series of input frames, and storing the encoded bitstream in a bitstream buffer of the video encoder;
   decoding the encoded bitstream stored in the bitstream buffer to generate a first reference frame, and storing the first reference frame in a frame buffer of the video encoder; and
   performing inter-prediction on a second input frame determined as a key P-frame among the series of input frames according to the first reference frame obtained from the frame buffer;
   wherein the step of generating the encoded bitstream with respect to the first input frame determined as the I-frame among the series of input frames comprises:
      performing intra-prediction on the first input frame determined as the I-frame among the series of input frames to generate an intra-predicted frame;
      generating a residual frame based on the intra-predicted frame and the first input frame; and
      performing entropy coding based on quantized transform coefficients corresponding to the residual frame and associated intra-prediction mode information to generate the encoded bitstream with respect to the first input frame.

2. The method of claim 1, further comprising:
   storing a reconstructed frame corresponding to the first input frame determined as the I-frame in the frame buffer.

3. The method of claim 1, further comprising:
   performing inter-prediction on a third input frame determined as the P-frame among the series of input frames according to a second reference frame obtained from the frame buffer, wherein the second reference frame is a reconstructed frame generated when the video encoder encodes a previous input frame prior to the third input frame.

4. The method of claim 1, wherein the first input frame and the second input frame belong to a group of pictures (GOP).

5. The method of claim 1, wherein the step of decoding the encoded bitstream stored in the bitstream buffer to generate the first reference frame is performed by a decoding circuit which is embedded in the video encoder.

6. The method of claim 1, wherein the step of decoding the encoded bitstream stored in the bitstream buffer to generate the first reference frame comprises:
   performing entropy decoding, inverse quantization and inverse transformation on the encoded bitstream to generate restored residual data; and
   performing intra-prediction according to the restored residual data to reconstruct the first reference frame.

7. A video encoder, comprising:
   a receiving circuit, configured to receive a series of input frames;
   an intra-prediction circuit, configured to perform intra-prediction on a first input frame determined as an intra frame (I-frame) among the series of input frames;
   an inter-prediction circuit, configured to perform inter-prediction on a second input frame determined as a key predictive frame (key P-frame) among the series of input frames according to a first reference frame which is derived from an encoded bitstream with respect to the first input frame;
   an entropy encoding circuit, configured to generate the encoded bitstream with respect to the first input frame;
   a bitstream buffer, configured to store the encoded bitstream;
   a decoding circuit, configured to decode the encoded bitstream stored in the bitstream buffer to generate the first reference frame;
   a frame buffer, configured to store the first reference frame; and
   a residual calculation circuit, configured to generate a residual frame based on an intra-predicted frame and the first input frame;
   wherein the intra-prediction circuit performs intra-prediction on the first input frame determined as the I-frame among the series of input frames to generate the intra-predicted frame, and the entropy encoding circuit performs entropy coding based on quantized transform coefficients corresponding to the residual frame and associated intra-prediction mode information to generate the encoded bitstream with respect to the first input frame.

8. The video encoder of claim 7, further comprising a deblocking filter circuit, wherein the deblocking filter circuit is configured to:
   generate and store a reconstructed frame corresponding to the first input frame determined as the I-frame in the frame buffer.

9. The video encoder of claim 7, wherein the inter-prediction circuit is further configured to:
   perform inter-prediction on a third input frame determined as a predictive frame (P-frame) among the series of input frames according to a second reference frame obtained from the frame buffer, wherein the second reference frame is a reconstructed frame generated when the video encoder encodes a previous input frame prior to the third input frame.

10. The video encoder of claim 7, wherein the first input frame and the second input frame belong to a group of pictures (GOP).

11. The video encoder of claim 7, wherein the decoding circuit is further configured to:
perform entropy decoding, inverse quantization and inverse transformation on the encoded bitstream to generate restored residual data; and
perform intra-prediction according to the restored residual data to reconstruct the first reference frame.

* * * * *